United States Patent Office 2,773,084
Patented Dec. 4, 1956

2,773,084

CATALYTIC CARBON MONOXIDE HYDROGENATION WITH HIGH ESTER YIELD

Walter Rottig, Oberhausen-Sterkrade-Nord, Germany, assignor to Ruhrchemie Aktiengesellschaft, Oberhausen-Holten, and Lurgi Gesellschaft für Waermetechnik m. b. H., Frankfurt am Main Heddernheim, Germany No Drawing. Application April 2, 1952,
Serial No. 280,172

Claims priority, application Germany April 12, 1951

1 Claim. (Cl. 260—449.6)

This invention relates to improvements in catalytic carbon monoxide hydrogenation with a low methane formation. It more particularly relates to an improvement in a process for the catalytic hydrogenation of carbon monoxide with the formation of hydrogenation products having a high content of oxygen-containing compounds, so that the methane formation is reduced and the formation of synthesis products having a high molecular weight is increased.

In my United States patent application, Serial No. 215,010, filed March 10, 1951, a process for the production of carbon monoxide hydrogenation products having a high content of oxygenaceous compounds is described. In accordance with the process described in the said application, a synthesis gas containing at least 1.2 parts and preferably 1.5 to 2.0 parts by volume of hydrogen per part by volume of carbon monoxide are passed over special precipitated iron catalysts. Yields of more than 60% oxygenaceous compounds may be obtained from the synthesis products of this special synthesis. The precipitated iron catalysts, according to the said application, must contain a free alkali oxide present in amount calculated as $K_2O$ of at least 5% in relation to the iron content. The special catalysts should preferably contain the free alkali oxide calculated as $K_2O$ in an amount of about 8 to 12% of $K_2O$. It is not necessary that these catalysts contain any carrier materials, and if carrier material is present, it should not be present in amount exceeding 20%.

One object of this invention is to decrease the methane formation and to increase the formation of the higher molecular weight compounds in the above-mentioned synthesis process. This and still further objects will become apparent from the following description:

It was generally believed that the process described by said application Serial No. 215,010 could only be effected and the desirable results could only be obtained by using a synthesis gas containing at least 1.2 and preferably at least 1.5 parts by volume of hydrogen per part by volume of carbon monoxide.

It has now been very surprisingly and unexpectedly found that carbon monoxide hydrogenation products having a high content of oxygen-containing products may be obtained by the hydrogenation of carbon monoxide in the presence of precipitated alkali iron catalysts in accordance with my application No. 215,010 with the use of a synthesis gas containing only 0.5 to 1.2 parts by volume of hydrogen for every part by volume of carbon monoxide.

Even more startling than the fact that the desirable results can be obtained with the use of only 0.5–1.2 parts by volume of hydrogen for every part by volume of carbon monoxide, is that considerable advantages are obtained with the reduced hydrogen to carbon monoxide ratio. Entirely unexpectedly the formation of methane and of the $C_2$ hydrocarbons which are generally undesirable is markedly reduced. In addition, the yield of the very desirable high molecular weight compounds in the boiling range above approximately 320° C. is increased. In addition, a considerable increase of the portion of esters, principally in the higher boiling range, is obtained. These high molecular weight esters are specially valuable for various technical purposes. After the separation of the accompanying compounds, and mainly after the separation from the accompanying hydrocarbons, these esters may be directly put to further use. If, it is desirable to obtain larger quantities of high molecular weight alcohols, it is possible to do so by saponifying the esters in the known manner, i. e. with the use of acids or alkaline media at normal or elevated pressure. The acid component of these esters has been found to be present principally as acetic and propionic acid, so that the corresponding alcohols which may be obtained from these esters have a molecular size of two to three carbon atoms smaller than the esters.

The use of gases rich in carbon monoxide in accordance with the invention is of decided economic advantage in commercial operation. Synthesis gases are normally produced from coal with the use of water vapor and oxygen-containing gases. These synthesis gases so produced are relatively rich in carbon monoxide. The use of these gases in this condition is, of course, very desirable and the conversion into gases which are rich in hydrogen is expensive and results in an economic loss.

Besides the use of a synthesis gas containing only 0.5 to 1.2 parts by volume of hydrogen for every part by volume of carbon monoxide, the synthesis is effected in any of the manners described in said application No. 215,010. The catalyst used is exactly the same and all other conditions are identical.

The catalyst of application No. 215,010 is a precipitated iron catalyst containing a free alkali oxide calculated as $K_2O$ present in amounts of about 5 to 12% $K_2O$ and being substantially free from alkali compounds of nonvolatile acids. The catalyst contains 0 to 20% of an inert carrier based on the iron present and is reduced with a hydrogen containing gas at a temperature of about 250 to 350° C. to a reduction value of at least 60%.

The following example is given to further illustrate and not limit the invention:

Example 1

An iron catalyst, identical with the iron catalyst described in Example I of my said application No. 215,010, containing 100 parts of iron (Fe), 5 parts of copper (Cu), 10 parts of lime (CaO) and 10 parts of kieselguhr, was precipitated from a solution of corresponding metal nitrates by means of a boiling soda solution. Upon completion of the precipitation, the pH was 9.2. The precipitated mass was immediately pressed in a filter press, the mother liquor being filtered off. The filter cake was partially washed with distilled water to a residual alkali content of 8.4%, calculated as $K_2O$ and relative to the iron content. This partially washed mass was predried to a residual water content of 60% $H_2O$ and molded into threads 3.5 mm. thick, in a thread press. The catalyst molded in this manner was then finally dried at 110° C., broken into small pieces and screened through a sieve.

In a suitable reduction apparatus this catalyst was reduced at a temperature of 310° C. with a gas mixture consisting of 75% hydrogen and 25% nitrogen, and with a linear gas velocity calculated cold, of 1.20 metres per second. The reduction time was 90 minutes. The reduced catalyst contained 70% of free iron, relative to a total content of iron.

A gas consisting of 45% by volume of carbon monoxide, 43% by volume of hydrogen and 12% by volume of carbon dioxide, nitrogen and methane, was passed over the catalyst. The synthesis pressure was 20 atmospheres. At a temperature of 212° C. a conversion of 56% $CO+H_2$ was obtained. The methane formation and the formation of $C_2$ hydrocarbons decreased to approximately 8% as compared with approximately 18% in the analogous method of operation with the synthesis gas of the main application.

The analysis of the liquid product showed a content of 27% of products boiling above 320° C. as compared with 13% in the product obtained according to Example 1 of the said application. 40% of these 27% were present in the form of high molecular weight esters from which, after saponification with, for example, aqueous potassium solution, 35% could be obtained in the form of high molecular weight alcohols.

*Example 2*

A gas consisting of 56% by volume of carbon monoxide, 35% by volume of hydrogen and 9% by volume of carbon dioxide, nitrogen and methane, was passed over the same catalyst as used in Example 1. The synthesis pressure was 20 atmospheres, the gas load was 100 volumes of gas per volume of catalyst per hour, and the recycle ratio was 1+2.

At a temperature of 222° C., a conversion of 58% $CO+H_2$ was obtained. In spite of the increased operational temperature as compared with that of Example 1, the methane formation had decreased to approximately 5%. Also the formation of $C_2$ hydrocarbons was correspondingly lower.

The analysis of the liquid product showed a content of 40% of compounds boiling above 320° C. in which 37% of esters, based on the total portion boiling above 320° C., were present. Also in the diesel oil fraction boiling from 180 to 320° C., the ester content had considerably increased as compared with Example 1.

I claim:

In the method for the catalytic hydrogenation of carbon monoxide with the production of synthesis products containing a major portion of oxygenous compounds in which a carbon monoxide hydrogen containing synthesis gas is contacted at an elevated temperature with a precipitated iron catalyst containing a free alkali oxide calculated as $K_2O$ and present in amount of about 5 to 12% $K_2O$ and being substantially free from alkali compounds of non-volatile acids and containing 0 to 20% inert carrier based on the iron present, said catalyst being reduced with a hydrogen containing gas at a temperature of 250 to 350° C. prior to said contacting to reduction value of at least 60%, the improvement for increasing the yield of high molecular weight esters and reducing the yield of hydrocarbons having 1-2 carbon atoms which comprises effecting said contacting with a synthesis gas containing from 0.5 to 1.2 parts by volume of hydrogen for every part by volume of carbon monoxide, and recovering the hydrogenation products produced containing a high yield of high molecular weight esters and a low yield of hydrocarbons having 1-2 carbon atoms.

References Cited in the file of this patent

UNITED STATES PATENTS

| | | |
|---|---|---|
| 1,801,382 | Wietzel et al. | Apr. 21, 1931 |
| 2,567,295 | Milligan et al. | Sept. 11, 1951 |
| 2,598,503 | Burton | May 27, 1952 |
| 2,598,647 | McGrath | May 27, 1952 |
| 2,615,910 | Cier | Oct. 28, 1952 |
| 2,617,774 | Rottig et al. | Nov. 18, 1952 |
| 2,628,969 | Rottig | Feb. 17, 1953 |
| 2,660,599 | Rottig | Nov. 24, 1953 |